United States Patent
Jackson et al.

(10) Patent No.: US 10,678,741 B2
(45) Date of Patent: *Jun. 9, 2020

(54) COUPLING PARALLEL EVENT-DRIVEN COMPUTATION WITH SERIAL COMPUTATION

(71) Applicant: International Business Machines Corporation, Armonk, NY (US)

(72) Inventors: Bryan L. Jackson, Fremont, CA (US); Dharmendra S. Modha, San Jose, CA (US); Norman J. Pass, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 279 days.

This patent is subject to a terminal disclaimer.

(21) Appl. No.: 15/163,563

(22) Filed: May 24, 2016

(65) Prior Publication Data

US 2016/0267376 A1 Sep. 15, 2016

Related U.S. Application Data

(63) Continuation of application No. 14/059,340, filed on Oct. 21, 2013, now Pat. No. 9,390,368.

(51) Int. Cl.
*G06F 13/42* (2006.01)
*G06N 3/04* (2006.01)
(Continued)

(52) U.S. Cl.
CPC ...... *G06F 13/4221* (2013.01); *G06F 13/4282* (2013.01); *G06N 3/04* (2013.01); *G06N 3/063* (2013.01); *G06N 3/08* (2013.01)

(58) Field of Classification Search
None
See application file for complete search history.

(56) References Cited

U.S. PATENT DOCUMENTS 4,874,963 A * 10/1989 Alspector .............. G06N 3/063
326/36
5,170,463 A 12/1992 Fujimoto
(Continued)

FOREIGN PATENT DOCUMENTS

CN 101299233 A 11/2008
CN 101917150 A 12/2010
CN 102331528 A 1/2012

OTHER PUBLICATIONS

Chandrasekaran et al, Compilation and Parallelization Techniques with Tool Support to Realize Sequence Alignment Algorithm on FPGA and Multicore, 2007.*

(Continued)

*Primary Examiner* — Li B. Zhen
*Assistant Examiner* — Mikayla Chubb
(74) *Attorney, Agent, or Firm* — Sherman IP LLP; Kenneth L. Sherman; Hemavathy Perumal

(57) ABSTRACT

The present invention provides a system comprising a neurosynaptic processing device including multiple neurosynaptic core circuits for parallel processing, and a serial processing device including at least one processor core for serial processing. Each neurosynaptic core circuit comprises multiple electronic neurons interconnected with multiple electronic axons via a plurality of synapse devices. The system further comprises an interconnect circuit for coupling the neurosynaptic processing device with the serial processing device. The interconnect circuit enables the exchange of data packets between the neurosynaptic processing device and the serial processing device.

13 Claims, 10 Drawing Sheets

(51) Int. Cl.
*G06N 3/063* (2006.01)
*G06N 3/08* (2006.01)

(56) References Cited

U.S. PATENT DOCUMENTS

| | | | | |
|---|---|---|---|---|
| 5,793,091 | A * | 8/1998 | Devoe | G06N 99/002 257/17 |
| 6,332,137 | B1 | 12/2001 | Hori et al. | |
| 6,633,053 | B1 * | 10/2003 | Jaeger | B82Y 10/00 257/14 |
| 7,376,547 | B2 * | 5/2008 | Meredith | B82Y 10/00 703/2 |
| 7,707,128 | B2 | 4/2010 | Matsugu et al. | |
| 7,875,876 | B1 * | 1/2011 | Wandzura | B82Y 10/00 257/26 |
| 8,990,130 | B2 | 3/2015 | Alvarez-Icaza Rivera | |
| 9,159,020 | B2 | 10/2015 | Alcarez-Icaza Rivera | |
| 2002/0032670 | A1 | 3/2002 | Watanabe et al. | |
| 2004/0193558 | A1 | 9/2004 | Nugent | |
| 2006/0036559 | A1 | 2/2006 | Nugent | |
| 2008/0260257 | A1 * | 10/2008 | Rose | B82Y 10/00 382/195 |
| 2009/0092136 | A1 * | 4/2009 | Nazareth | H04L 45/745 370/392 |
| 2011/0060710 | A1 * | 3/2011 | Amin | G06F 15/16 706/13 |
| 2011/0119486 | A1 * | 5/2011 | Boldyrev | H04L 63/10 713/156 |
| 2011/0153533 | A1 * | 6/2011 | Jackson | G06N 3/049 706/17 |
| 2015/0039546 | A1 | 2/2015 | Alvarez-Icaza | |
| 2016/0267043 | A1 | 9/2016 | Jackson et al. | |

OTHER PUBLICATIONS

Da Cruz et al, Provenance Services for Distributed Workflows, 2008.*
Hammarlund et al, Large Neural Network Simulations on Multiple Hardware Platforms, 1998.*
Kim et al, A Functional Hybrid Memristor Crossbar-Array/CMOS System for Data Storage and Neuromorphic Applications, 2011.*
Nere et al, Simulating cortical networks on heterogeneous multi-GPU systems: Dividing tasks between CPU and GPUs, 2012.*
Schemmel et al, Implementing Synaptic Plasticity in a VLSI Spiking Neural Network Model, 2006.*
Schemmel et al, Wafer Scale Integration of Analog Neural Networks, 2008.*
Schemmel et al, A Wafer-Scale Neuromorphic Hardware System for Large-Scale Neural Modeling, 2010.*
Yu et al, 65k-Neuron Integrate-and-Fire Array Transceiver with Address-event Reconfigurable Synaptic Routing, 2012.*
Serrano-Gotarredona et al, CAVIAR: A 45k Neuron, 5M Synapse, 12G Connects/s AER Hardware Sensory-Processing-Learning-Actuating System for High-Speed Visual Object Recognition and Tracking (Year: 2009).*
Ekanayake et al, Quantum bit controller and observer circuits in SOS-CMOS technology for gigahertz low temperature operation (Year: 2007).*
Scholze et al, VLSI implementation of a 2.8 Gevent/s packet-based AER interface with routing and event sorting functionality (Year: 2011).*
Coffey et al, Multidimensional Linear Diffusion for Image Enhancement on a Type II Quantum Computer (Year: 2007).*
Neven et al, Image recognition with an adiabatic quantum computer (Year: 2008).*
Wang et al, Duplicate-Search-Based Image Annotation Using Web-Scale Data (Year: 2012).*
Zylberberg, A. et al., "The Human Turing Machine: A Neural Framework for Mental Programs", Trends in Cognitive Sciences, Jul. 2011, pp. 293-300, vol. 15, No. 7, Elsevier Ltd., USA.
Plana, L.A. et al., "SpiNNaker: Design and Implementation of a GALS Multicore System-on-Chip", Journal of Emerging Technologies in Computing Systems, Dec. 2011, pp. 1-18, vol. 7, No. 4, Article 17, ACM, United States.
U.S. Non-Final Office Action for U.S. Appl. No. 14/059,340 dated Nov. 25, 2015.
U.S. Notice of Allowance for U.S. Appl. No. 14/059,340 dated Mar. 16, 2016.
U.S. Non-Final Office Action for U.S. Appl. No. 15/163,570 dated Jan. 11, 2018.
U.S. Advisory Action for U.S. Appl. No. 15/163,570 dated Oct. 10, 2018.
U.S. Final Office Action for U.S. Appl. No. 15/163,570 dated Jul. 13, 2018.
U.S. Non-Final Office Action for U.S. Appl. No. 15/163,570 dated Jun. 7, 2019.
U.S. Final Office Action for U.S. Appl. No. 15/163,570 dated Oct. 3, 2019.
U.S. Advisory Action for U.S. Appl. No. 15/163,570 dated Dec. 12, 2019.

* cited by examiner

| R/C | ΔX | ΔY | DebugFlag | AxonBank | D | Axon | ns # COUPLING PARALLEL EVENT-DRIVEN COMPUTATION WITH SERIAL COMPUTATION

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computation, and in particular, coupling parallel event-driven computation with serial computation.

Neuromorphic and synaptronic computation, also referred to as artificial neural networks, are computational systems that permit electronic systems to essentially function in a manner analogous to that of biological brains. In traditional von Neumann architectures, memory and computation are separated. By comparison, embodiments of the invention utilize biologically inspired architecture where threshold based computation is integrated with memory. In neuromorphic and synaptronic computation, connections are created between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses.

BRIEF SUMMARY

One embodiment provides a system comprising a neurosynaptic processing device including multiple neurosynaptic core circuits for parallel processing, and a serial processing device including at least one processor core for serial processing. Each neurosynaptic core circuit comprises multiple electronic neurons interconnected with multiple electronic axons via a plurality of synapse devices. The system further comprises an interconnect circuit for coupling the neurosynaptic processing device with the serial processing device. The interconnect circuit enables the exchange of data packets between the neurosynaptic processing device and the serial processing device.

Another embodiment provides a method comprising routing one or more serialized data packets to at least one serial processing device for serial processing, and routing one or more de-serialized data packets to at least one neurosynaptic processing device for parallel processing. Each serial processing device comprises at least one processor core for serial processing. Each neurosynaptic processing device comprises multiple neurosynaptic core circuits for parallel processing. Each neurosynaptic core circuit includes multiple electronic neurons interconnected with multiple electronic axons via a plurality of synapse devices. The neurosynaptic processing devices are coupled with the serial processing devices via an interconnect circuit for data exchange therebetween.

These and other features, aspects and advantages of the present invention will become understood with reference to the following description, appended claims and accompanying figures.

DETAILED DESCRIPTION

Figure 1:
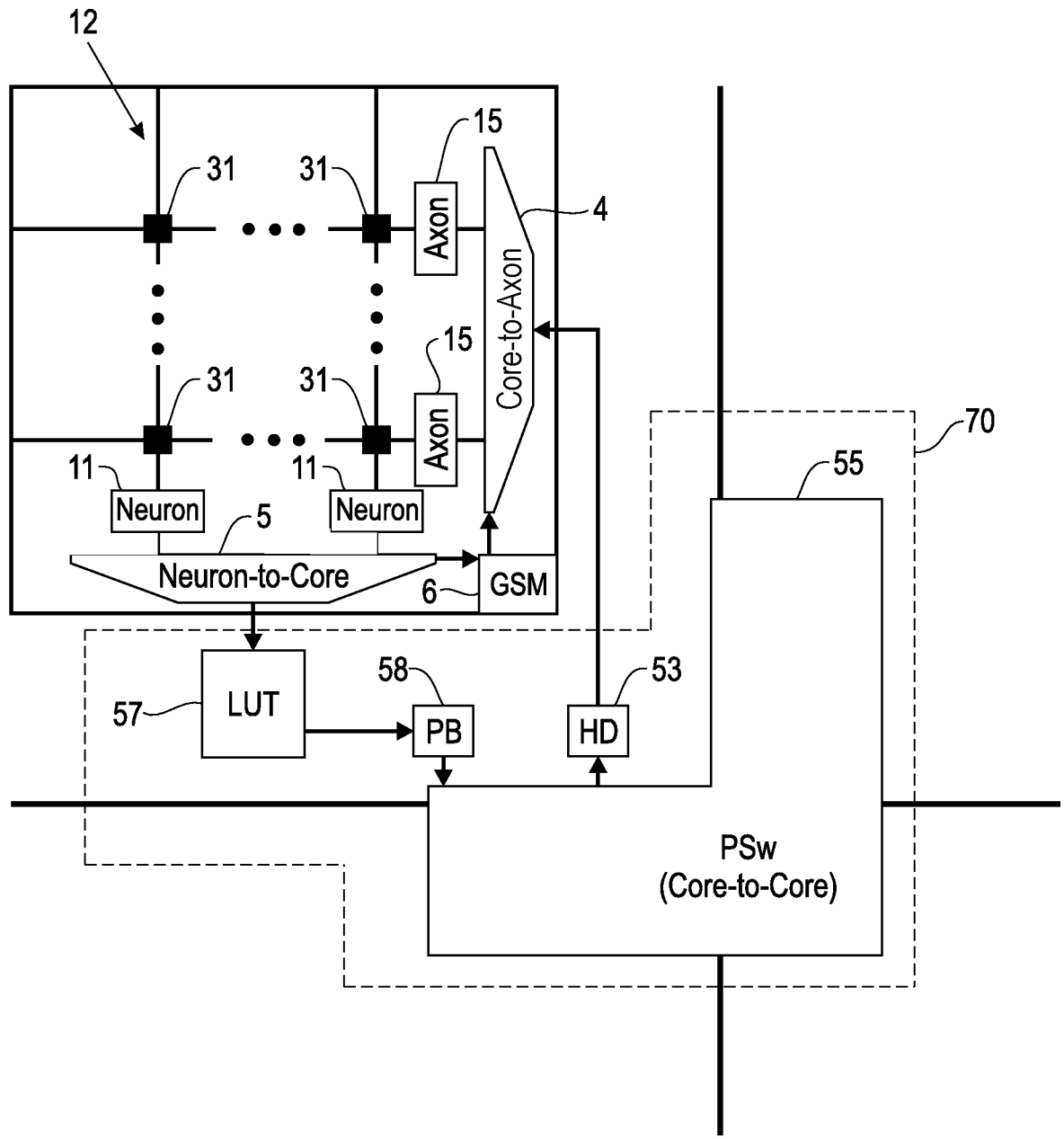
FIG. 1 illustrates an example core circuit, in accordance with an embodiment of the invention.

Embodiments of the invention relate to neuromorphic and synaptronic computation, and in particular, coupling parallel event-driven computation with serial computation. One embodiment provides a system comprising a neurosynaptic processing device including multiple neurosynaptic core circuits for parallel processing, and a serial processing device including at least one processor core for serial processing. An interconnect circuit couples the neurosynaptic processing device with the serial processing device, and enables the exchange of data packets between the neurosynaptic processing device and the serial processing device. Coupling the serial processing device with the neurosynaptic processing device allows for symbolic computing (e.g., algorithms and analytics) and sub-symbolic computing (e.g., pattern recognition).

Another embodiment provides a method comprising routing one or more serialized data packets to at least one serial processing device for serial processing, and routing one or more de-serialized data packets to at least one neurosynaptic processing device for parallel processing. The neurosynaptic processing devices are coupled with the serial processing devices via an interconnect circuit for data exchange therebetween.

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons, according to embodiments of the invention, may include various electronic circuits that are modeled on biological neurons. Further, a neuromorphic and synaptronic computation comprising electronic neurons, according to embodiments of the invention, may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation, according to embodiments of the invention, can be implemented as a neuromorphic and synaptronic architecture comprising circuitry, and additionally as a computer simulation. Indeed, embodiments of the invention can take the form of an entirely hardware embodiment, an entirely software embodiment, or an embodiment containing both hardware and software elements.

The term electronic axon as used herein represents an architecture configured to simulate a biological axon that transmits information from one biological neuron to different biological neurons. In one embodiment, an electronic axon comprises a circuit architecture. An electronic axon is functionally equivalent to axons of a biological brain. As such, neuromorphic and synaptronic computation involving electronic axons according to embodiments of the invention may include various electronic circuits that are modeled on biological axons. Although certain illustrative embodiments of the invention are described herein using electronic axons comprising electronic circuits, the present invention is not limited to electronic circuits.

In one embodiment, a neuromorphic system comprises a system that implements neuron models, synaptic models, neural algorithms, and/or synaptic algorithms. In one embodiment, a neuromorphic system comprises software components and/or hardware components, such as digital hardware, analog hardware or a combination of analog and digital hardware (i.e., mixed-mode).

FIG. 1 illustrates an example core circuit 10, in accordance with an embodiment of the invention. The core circuit 10 comprises a plurality of electronic neurons 11 and a plurality of electronic axons 15. The neurons 11 and the axons 15 are interconnected via an m×n crossbar 12 comprising intra-core electronic synapse devices ("synapses") 31, wherein "x" represents multiplication, and m and n are positive integers. Each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively. Each synapse 31 and each neuron 11 has configurable operational parameters.

In one embodiment, the core circuit 10 is a uni-directional core, wherein the neurons 11 and the axons 15 of the core circuit 10 are arranged as a single neuron array and a single axon array, respectively. In another embodiment, the core circuit 10 is a bi-directional core, wherein the neurons 11 and the axons 15 of the core circuit 10 are arranged as two neuron arrays and two axon arrays, respectively. For example, a bi-directional core circuit 10 may have a horizontal neuron array, a vertical neuron array, a horizontal axon array and a vertical axon array, wherein the crossbar 12 interconnects the horizontal neuron array and the vertical neuron array with the vertical axon array and the horizontal axon array, respectively.

Each neuron 11 receives firing events via interconnected axons and, in response to the firing events received, generates a firing event according to a neuronal activation function. A preferred embodiment for the neuronal activation function can be leaky integrate-and-fire.

An external two-way communication environment may supply sensory inputs and consume motor outputs. The neurons 11 and axons 15 are implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 are implemented using 1-bit static random-access memory (SRAM) cells. Neurons 11 that generate a firing event are selected one at a time, and the firing events are delivered to target axons 15, wherein the target axons 15 may reside in the same core circuit 10 or somewhere else in a larger system with many core circuits 10.

As shown in FIG. 1, the core circuit 10 further comprises an address-event receiver (Core-to-Axon) 4, an address-event transmitter (Neuron-to-Core) 5, and a controller 6 that functions as a global state machine (GSM). The address-event receiver 4 receives firing events and transmits them to target axons 15. The address-event transmitter 5 transmits firing events generated by the neurons 11 to the core circuits 10 including the target axons 15.

The controller 6 sequences event activity within a time-step. The controller 6 divides each time-step into operational phases in the core circuit 10 for neuron updates, etc. In one embodiment, within a time-step, multiple neuron updates and synapse updates are sequentially handled in a read phase and a write phase, respectively. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

As shown in FIG. 1, the core circuit 10 further comprises a routing fabric 70. The routing fabric 70 is configured to selectively route neuronal firing events among core circuits 10. The routing fabric 70 comprises a firing events address lookup table (LUT) module 57, a packet builder (PB) module 58, a head delete (HD) module 53, and a core-to-core packet switch (PSw) 55. The LUT 57 is an N address routing table is configured to determine target axons 15 for firing events generated by the neurons 11 in the core circuit 10. The target axons 15 may be axons 15 in the same core circuit 10 or other core circuits 10. The LUT 57 retrieves information such as target distance, direction, addresses, and delivery times (e.g., about 19 bits/packet×4 packets/neuron). The LUT 57 converts firing events generated by the neurons 11 into forwarding addresses of the target axons 15.

The PB 58 packetizes the routing information retrieved by the LUT 57 into outgoing address-event router packets. The core-to-core PSw 55 is an up-down-left-right mesh router configured to direct the outgoing address-event router packets to the core circuits 10 containing the target axons 15. The core-to-core PSw 55 is also configured to receive incoming address-event router packets from the core circuits 10. The HD 53 removes routing information from an incoming address-event router packet to deliver it as a time stamped firing event to the address-event receiver 4.

In one example implementation, the core circuit 10 may comprise 256 neurons 11. The crossbar 12 may be a 256×256 ultra-dense crossbar array that has a pitch in the range of about 0.1 nm to 10 μm. The LUT 57 of the core circuit 10 may comprise 256 address entries, each entry of length 32 bits.

In one embodiment, soft-wiring in the core circuit 10 is implemented using address events which are non-deterministic (e.g., Address-Event Representation (AER)).

Although certain illustrative embodiments of the invention are described herein using synapses comprising electronic circuits, the present invention is not limited to electronic circuits.

Figure 2:
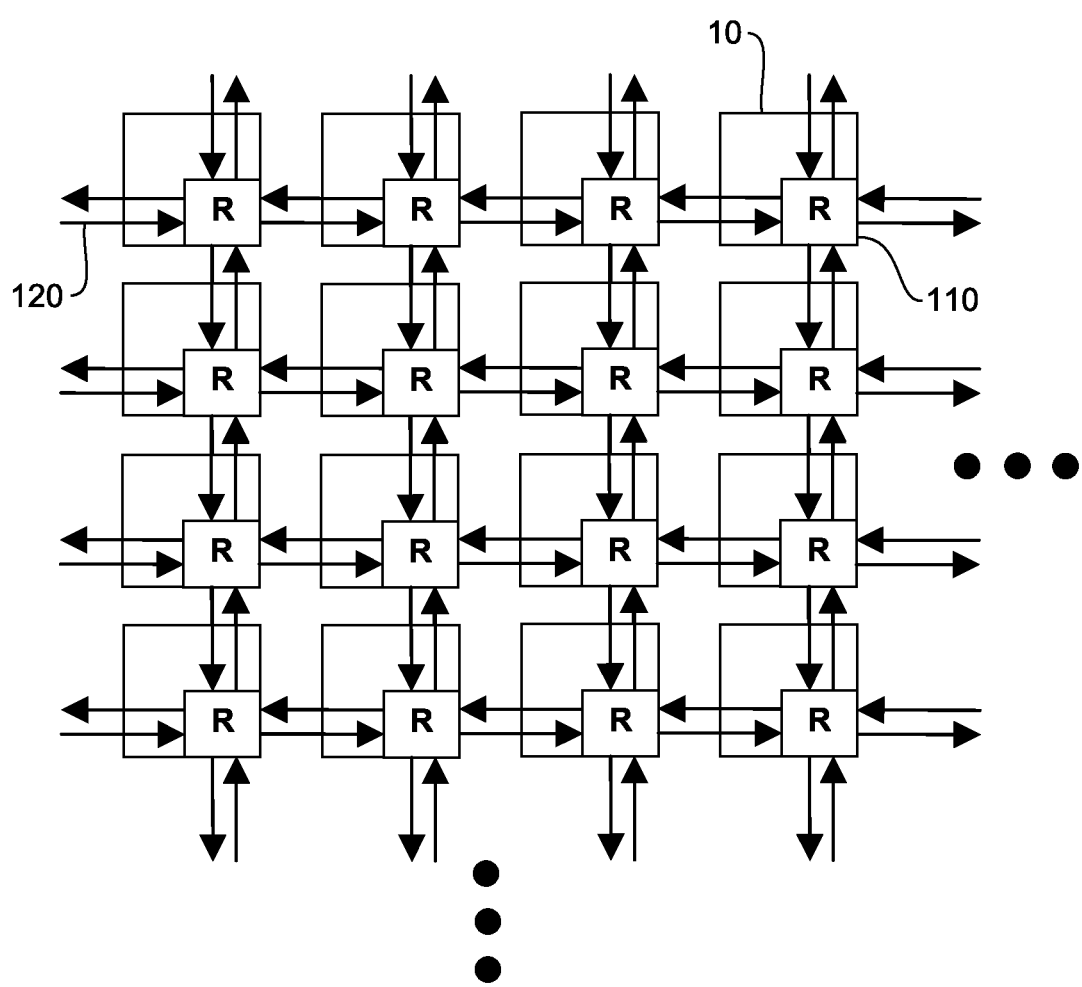
FIG. 2 illustrates an example neurosynaptic processor unit, in accordance with an embodiment of the invention.

FIG. 2 illustrates an example neurosynaptic processor unit (i.e., neurosynaptic processing device) 100, in accordance with embodiments of the invention. The neurosynaptic processor unit 100 comprises multiple interconnected core circuits 10. In one embodiment, the core circuits 10 are arranged in an m×n array, wherein m and n are positive integers.

Each core circuit 10 has a corresponding router (R) 110 for routing neuronal firing events in multiple directions, such as an eastbound direction, a westbound direction, a northbound direction, and a southbound direction. The routers 110 are interconnected via communication paths 120. Each router 110 is interconnected with at least one other router 110 in the eastbound, westbound, northbound and/or southbound direction. Each core circuit 10 receives incoming neuronal firing events from, and sends outgoing neuronal firing events to, another core circuit 10 via a corresponding router 110. The routers 110 facilitate the propagation of neuronal firing events to target destinations (e.g., a target axon 15 of a core circuit 10).

In one embodiment, each router 110 comprises a core-to-core PSws 55 (FIG. 1).

The neurosynaptic processing unit 100 provides parallel and distributed processing in a scalable low power network. The core circuits 10 operate in a parallel event-driven manner to efficiently perform operations involving sub-symbolic data, such as pattern recognition.

In one embodiment, the neurosynaptic processing unit 100 is implemented as a chip structure comprising 1,024 core circuits 10 operating in a parallel event-driven manner.

Parallel computational elements (e.g., the neurosynaptic processing unit 100) efficiently perform operations requiring relatively frequent access to memory. By comparison, serial computational elements (e.g., a central processing unit) efficiently perform complex algorithmic and analytic operations requiring relatively infrequent access to memory (e.g., operations such as derivatives, multiplication, integrals, and other operations involving text, numbers, and symbolic data).

Figure 3:
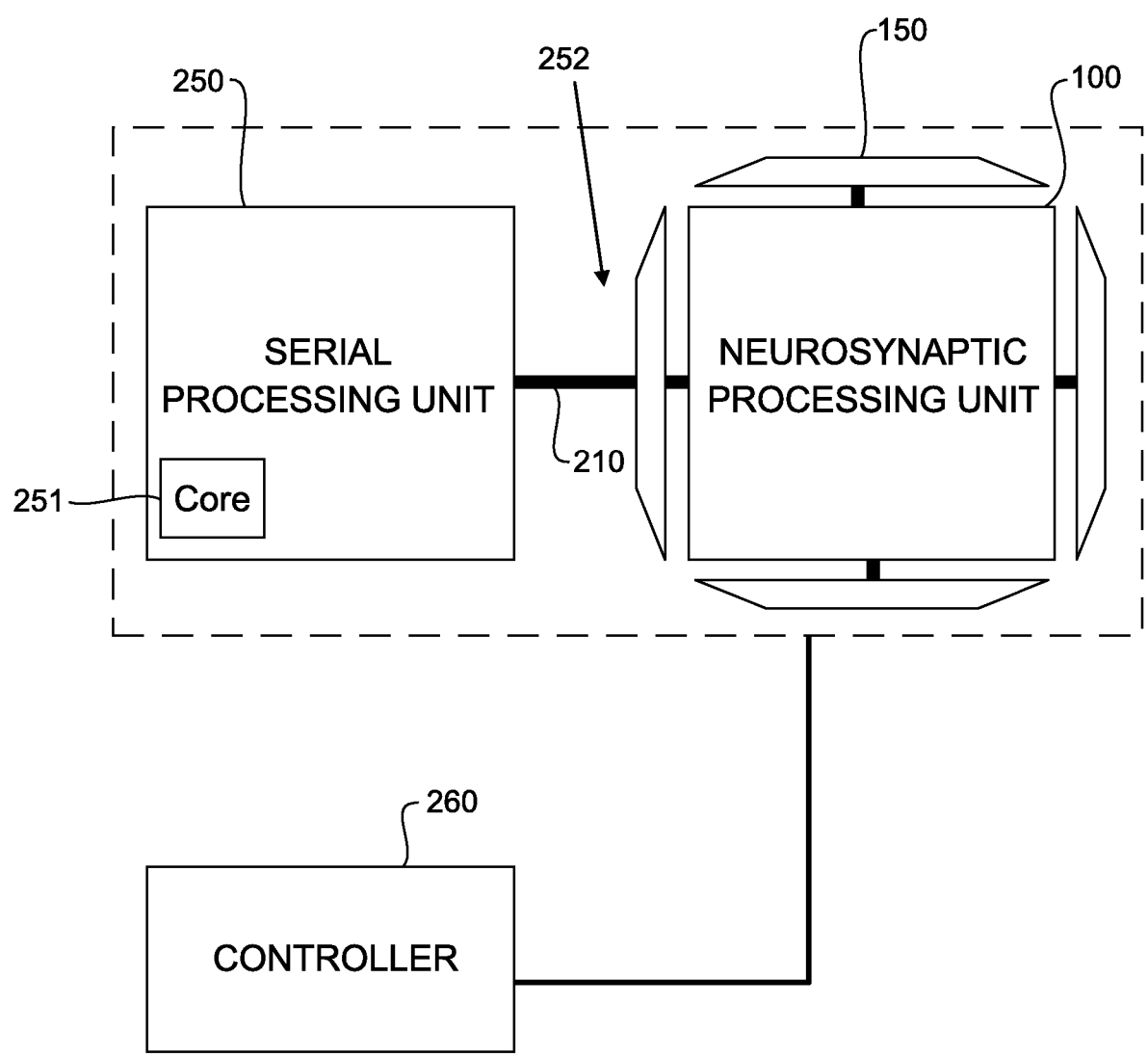
FIG. 3 illustrates a system providing both parallel processing and serial processing, in accordance with an embodiment of the invention.

FIG. 3 illustrates a system 200 providing both parallel processing and serial processing, in accordance with an embodiment of the invention. The system 200 comprises at least one serial processing unit (i.e., serial processing device) 250 providing serial and centralized processing ("serial processing"). Serial processing involves performing operations or tasks one at a time (i.e., serially). Each serial processing unit 250 comprises at least one independent processor core 251 (e.g., a central processing unit). In one embodiment, a serial processing unit 100 may be an IBM POWER series processor, an IBM CELL processor, an Intel Pentium processor, an Intel Core processor, an ARM processor core, a graphical processing unit (GPU), etc.

The system 200 further comprises at least one neurosynaptic processing unit 100 providing parallel and distributed processing ("parallel processing"). Parallel processing involves performing multiple operations or tasks simultaneously. Each serial processing unit 250 is coupled with at least one neurosynaptic processing unit 100 via an interconnect fabric (i.e., interconnect circuit) 252. Coupling serial processing units 250 with neurosynaptic processing units 100 allows for symbolic computing (e.g., algorithms and analytics) and sub-symbolic computing (e.g., pattern recognition).

For example, the system 200 may pre-process a captured image using one or more serial processing units 250. The system 200 may then utilize one or more neurosynaptic processing units 100 to convert the pre-processed image into text with corresponding information relating to content and/or context, wherein the text and corresponding information are used to search for or create data (e.g., a document, a memo) related to the captured image.

As another example, the serial processing units 250 may implement learning algorithms (e.g., gradient descent, back propagation), while the neurosynaptic processing units 100 may implement feed forward processing.

In one embodiment, the interconnect fabric 252 includes a digital bus 210 for coupling a serial processing unit 250 with a neurosynaptic processing unit 100. There are several options for the bus 210, such as ARM's Advanced Microcontroller Bus Architecture, etc. In another embodiment, the interconnect fabric 252 includes a direct link 220 (FIG. 6) for directly coupling a serial processing unit 250 with a neurosynaptic processing unit 100.

The system 200 further comprises a controller unit (i.e., controller device) 260 for differentiating operations requiring serial computation from operations requiring parallel event-driven computation. In one embodiment, the controller unit 260 is configured to receive user input indicating operations and/or data requiring parallel event-driven computation, as well as identifying outputs generated by the system 200 (e.g., data generated by the neurosynaptic processing units 100) requiring serial computation. In another embodiment, the controller unit 260 implements an automated algorithm that parses data and categorizes the data as structured data (e.g., symbolic data that is pre-labeled, tagged, and/or categorized) or unstructured data (e.g., sub-symbolic data, such as raw images, raw audio, raw sensor data). The controller unit 260 routes structured data to at least one serial processing unit 250 for serial computation (e.g., analytics). The controller unit 260 routes unstructured data to at least one neurosynaptic processing unit 100 for parallel event-driven computation (e.g., tagging, labeling, and/or categorization).

In one embodiment, serializing and de-serializing circuitry 140 (FIG. 4) are utilized at a peripheral/boundary interface of each neurosynaptic processing unit 100 to link the neurosynaptic processing unit 100 with one or more serial processing units 250. The serializing and de-serializing circuitry 140 is configured to serialize outgoing data (i.e., off-chip communications) from the neurosynaptic processing unit 100. The serializing and de-serializing circuitry 140 is further configured to de-serialize incoming data for the neurosynaptic processing unit 100 from one or more connected serial processing units 250. As described in detail later herein, the serializing and de-serializing circuitry 140 comprises at least one funnel device 150 for serializing and/or de-serializing data.

Figure 4:
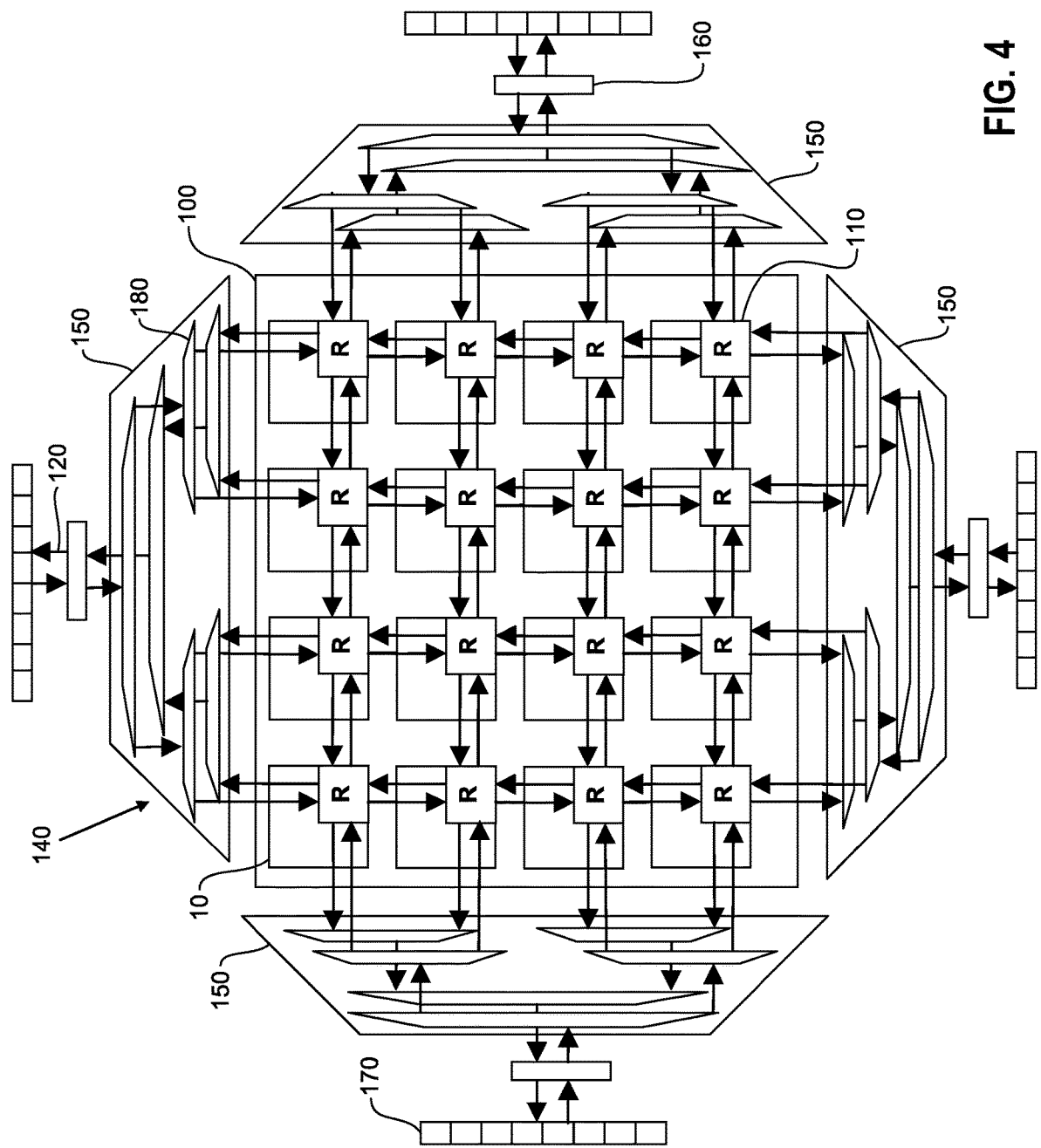
FIG. 4 illustrates an example neurosynaptic processing unit with serializing and de-serializing circuitry, in accordance with an embodiment of the invention.

FIG. 4 illustrates an example neurosynaptic processing unit 100 with serializing and de-serializing circuitry 140, in accordance with an embodiment of the invention. The serializing and de-serializing circuitry 140 comprises at least one funnel device 150 for serializing outgoing data in the eastbound direction and de-serializing incoming data from the eastbound direction, at least one funnel device 150 for serializing outgoing data in the westbound direction and de-serializing incoming data from the westbound direction, at least one funnel device 150 for serializing outgoing data in the northbound direction and de-serializing incoming data from the northbound direction, and at least one funnel device 150 for serializing outgoing data in the southbound direction and de-serializing incoming data from the southbound direction.

Each funnel device 150 comprises multiple funnel units (i.e., funnel devices) 180. The funnel units 180 merge and serialize outgoing data. Each funnel device 150 has a corresponding serialize/de-serialize unit (i.e., serialize/de-serialize device) 160 configured to tag each outgoing packet from the funnel device 150 with tag information identifying the location of a source core circuit 10 that generated the outgoing packet (e.g., the row/column of the source core circuit 10 on the neurosynaptic processing unit 100). Each tagged outgoing packet is routed to an input/output (I/O) pad 170 of the neurosynaptic processing unit 100 for delivery to a connected serial processing unit 250.

Incoming data from the I/O pads 170 of the neurosynaptic processing unit 100 are routed to a serialize/de-serialize unit 160 for un-tagging. For each incoming packet, tag information identifying a location of a core circuit 10 on the neurosynaptic processing unit 100 that the incoming packet targets (e.g., the row/column of the target core circuit 10 on the neurosynaptic processing unit 100) is removed. A corresponding funnel device 150 for the serialize/de-serialize unit 160 de-serializes incoming data, and routes each incoming packet to a target core circuit 10 on the neurosynaptic processing unit 100 based on tag information for the incoming packet.

Serializing communications at the interface/boundary of the neurosynaptic processing unit 100 allows for coupling/linking the neurosynaptic processing unit 100 with a serial processing unit 250.

In one embodiment, the system 200 is scalable and may be embodied as a on-board system, a system on chip, or a system in package.

Figure 5:
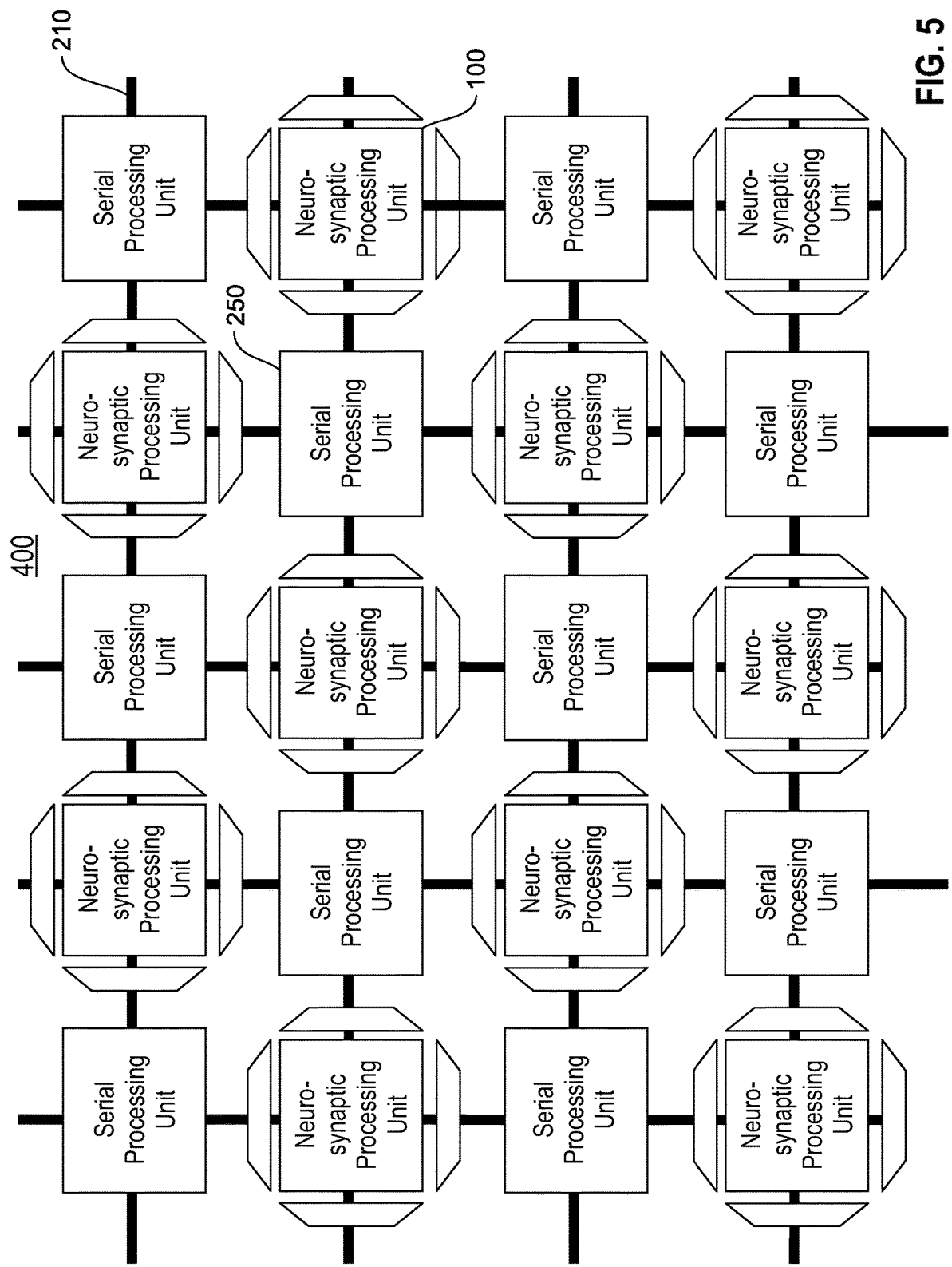
FIG. 5 illustrates an example on-board system, in accordance with an embodiment of the invention.

FIG. 5 illustrates an example on-board system 400, in accordance with an embodiment of the invention. The on-board system 400 comprises multiple serial processing units 250 and multiple neurosynaptic processing units 100. The on-board system 400 further comprises multiple buses 210 linking/coupling the serial processing units 250 with the multiple neurosynaptic processing units 100.

As shown in FIG. 5, each neurosynaptic processing unit 100 is coupled with a serial processing unit 250 in each direction (i.e., eastbound direction, westbound direction, northbound direction, and southbound direction). The on-board system 400 provides serial computation and parallel event-driven computation via the serial processing units 250 and the neurosynaptic processing units 100, respectively.

Figures 6, 7:
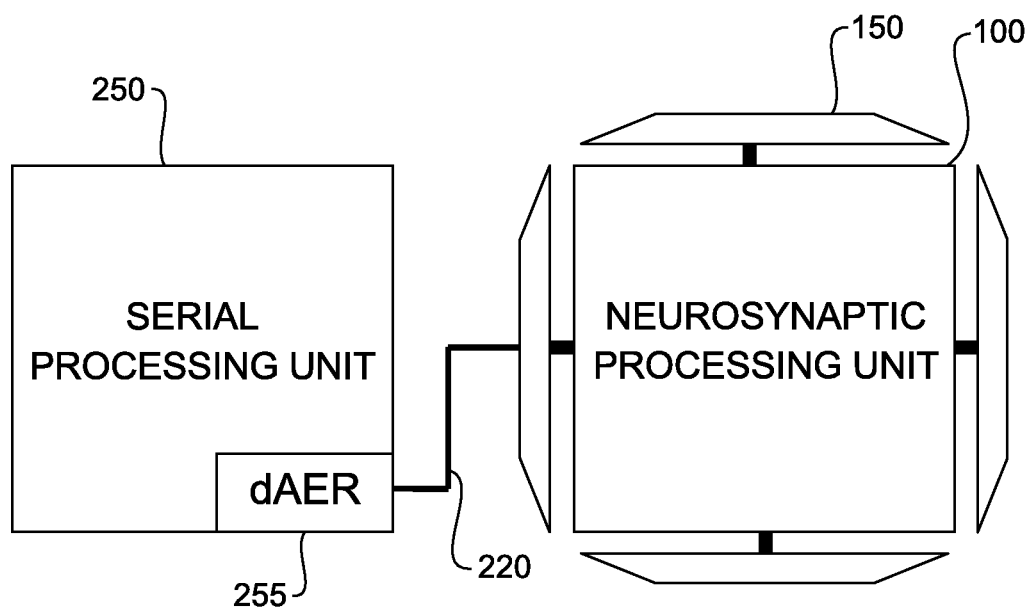
FIG. 6 illustrates a neurosynaptic processing unit directly coupled to a serial processing unit, in accordance with an embodiment of the invention.
FIG. 7 illustrates example address event representation information for a packet, in accordance with an embodiment of the invention.

FIG. 6 illustrates a neurosynaptic processing unit 100 directly coupled to a serial processing unit 250, in accordance with an embodiment of the invention. Instead of coupling the neurosynaptic processing unit 100 with the serial processing unit 250 via a bus 210, the neurosynaptic processing unit 100 in FIG. 6 is directly coupled to the serial processing unit 250 via a direct link 220. Communication between the serial processing unit 250 and the neurosynaptic processing unit 100 are exchanged based on a common communication protocol.

In one embodiment, packet exchange between the serial processing unit 250 and the neurosynaptic processing unit 100 is based on direct address event representation (dAER). The serial processing unit 250 comprises a dAER transmitter 255 for encapsulating outgoing packets with address event representation information.

FIG. 7 illustrates example address event representation information for a packet, in accordance with an embodiment of the invention. The address event representation information for the packet comprises a row/column (R/C) field, a $\Delta X$ field, a $\Delta Y$ field, a DebugFlag field, an AxonBank field, a delivery (D) field, and an AXON field. The R/C field identifies a destination row or a destination column of an m×n array of a neurosynaptic processing unit 100 that a funnel device 150 should route/steer the packet to. The $\Delta X$ field identifies the number of eastbound/westbound core circuits 10 the packet should traverse to reach a target core circuit 10. The range of possible values for the $\Delta X$ field includes positive and negative integers (e.g., −256 to 256), wherein a negative integer represents the number of westbound core circuits 10 to transverse (i.e., left traverse), and a positive integer represents the number of eastbound core circuits 10 to transverse (i.e., right transverse).

The $\Delta Y$ field identifies the number of northbound/southbound core circuits 10 the packet should traverse to reach a target core circuit 10. The range of possible values for the $\Delta Y$ field includes positive and negative integers (e.g., −256 to 256), wherein a negative integer represents the number of southbound core circuits 10 to transverse (i.e., down traverse), and a positive integer represents the number of northbound core circuits 10 to transverse (i.e., up transverse).

The DebugFlag field indicates a debug mode. If each core circuit 10 of the neurosynaptic processing unit 100 has only one axon array, the AxonBank field is set to 0. If each core circuit 10 of the neurosynaptic processing unit 100 has two axon arrays (i.e., a horizontal axon array and a vertical axon array), the AxonBank field is set to either 0 or 1 to indicate which axon array of the core circuit 10 to target. The D field identifies a delivery time for the packet based on a local timescale of the target core circuit 10. The AXON field identifies a target axon 15 of the target core circuit 10 that the packet should be delivered to.

In one embodiment, the R/C field maintains 5 bits of data, the $\Delta X$ field maintains 9 bits of data, the $\Delta Y$ field maintains 9 bits of data, the DebugFlag field maintains 1 bit of data, the AxonBank field maintains 1 bit of data, the D field maintains 4 bits of data, and the AXON field maintains 8 bits of data.

Figure 8:
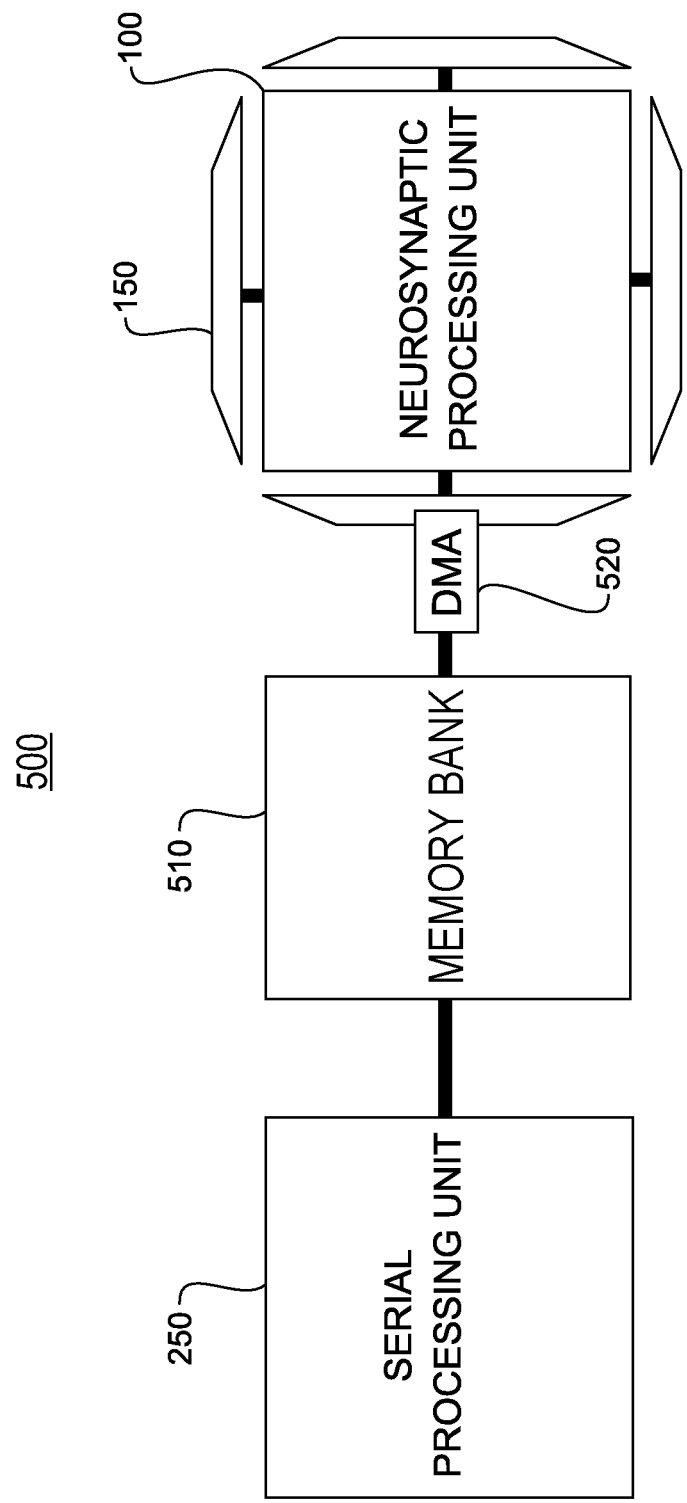
FIG. 8 illustrates an example system including a shared memory bank, in accordance with an embodiment of the invention.

FIG. 8 illustrates an example system 500 including a shared memory bank 510, in accordance with an embodiment of the invention. Both the serial processing unit 250 and the neurosynaptic processing unit 100 have access to the memory bank 510. In one embodiment, the neurosynaptic processing unit 100 has a corresponding direct memory access (DMA) module 520 configured to provide DMA to the memory bank 510.

The memory bank 510 is used for sharing stored data between the serial processing unit 250 and the neurosynaptic processing unit 100. For example, the system 500 may pre-process a set of images using the serial processing unit 250 and classify the set of images using the neurosynaptic processing unit 100. The neurosynaptic processing unit 100 may store classification labels for the set of images in the memory bank 510. The serial processing unit 250 may retrieve the classification labels from the memory bank 510 for further processing.

Figure 9:
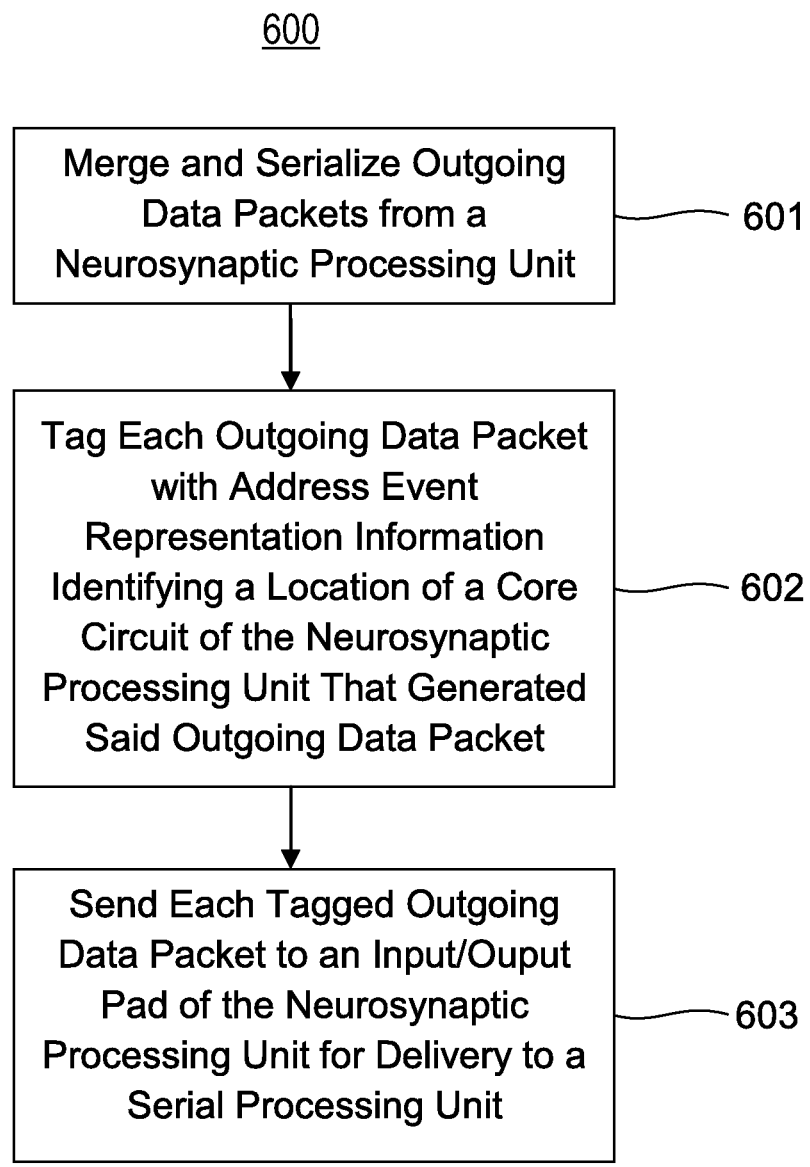
FIG. 9 illustrates a flowchart of an example process for serializing outgoing data from a neurosynaptic processing unit, in accordance with an embodiment of the invention.

FIG. 9 illustrates a flowchart of an example process 600 for serializing outgoing data from a neurosynaptic processing unit, in accordance with an embodiment of the invention. In process block 601, merge and serialize outgoing data packets from the neurosynaptic processing unit. In process block 602, tag each outgoing data packet with address event representation information identifying a location of a core circuit of the neurosynaptic processing unit that generated said outgoing data packet. In process block 603, send each tagged outgoing data packet to an input/output (I/O) pad of the neurosynaptic processing unit for delivery to a serial processing unit.

Figure 10:
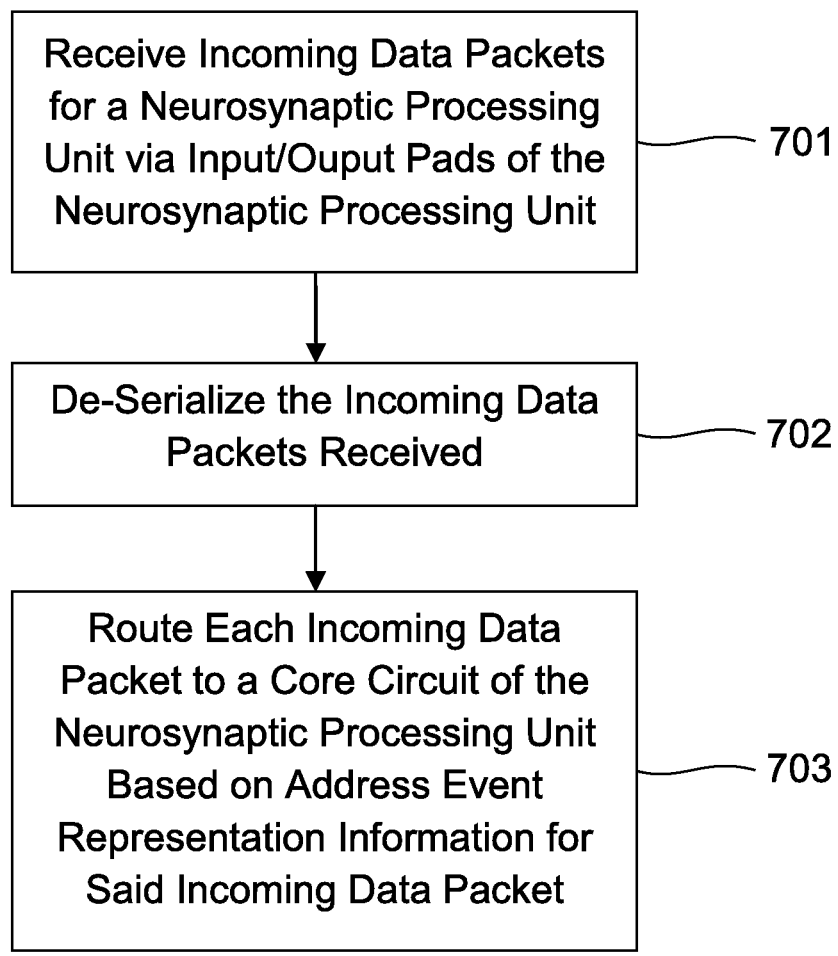
FIG. 10 illustrates a flowchart of an example process for de-serializing incoming data for a neurosynaptic processing unit, in accordance with an embodiment of the invention.

FIG. 10 illustrates a flowchart of an example process 700 for de-serializing incoming data for a neurosynaptic processing unit, in accordance with an embodiment of the invention. In process block 701, receive incoming data packets for a neurosynaptic processing unit via input/output (I/O) pads of the neurosynaptic processing unit. In process block 702, de-serialize the incoming data packets received. In process block 703, route each incoming data packet to a core circuit of the neurosynaptic processing unit based on address event representation for said incoming data packet.

Figure 11:
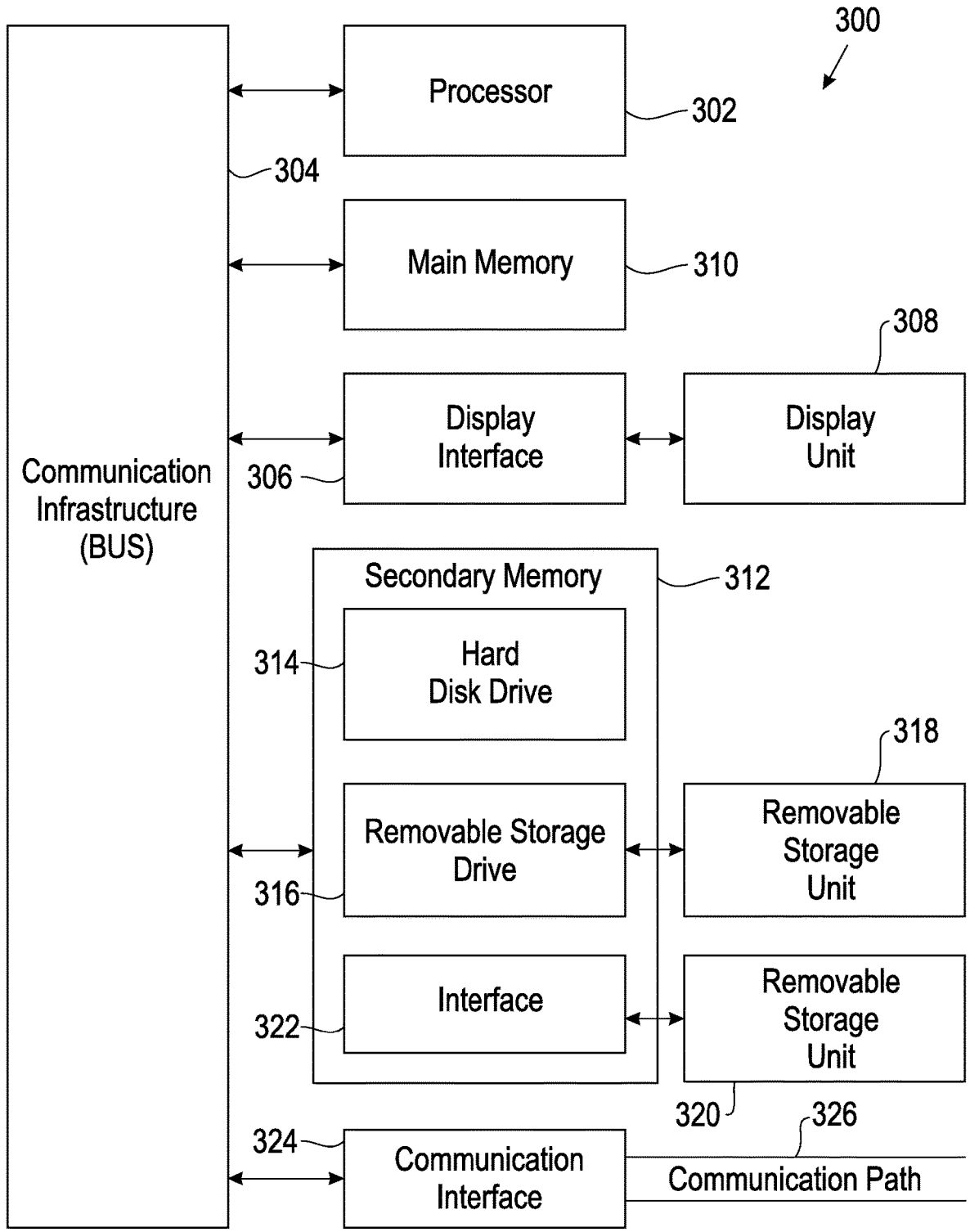
FIG. 11 illustrates a high-level block diagram showing an information processing system useful for implementing one embodiment of the present invention.

FIG. 11 is a high-level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    at a controller device:

determining a set of operations to perform on data received based on a type of the data received by parsing the data received and categorizing the data received as one of sub-symbolic data or symbolic data; and improving efficiency of performing the set of operations on the data received by routing the data received to one of: a serial processing device in response to categorizing the data received as symbolic data, or a neurosynaptic processing device in response to categorizing the data received as sub-symbolic data;

wherein the neurosynaptic processing device and the serial processing device are coupled via an interconnect circuit;

wherein the neurosynaptic processing device comprises multiple neurosynaptic core circuits configured for parallel and distributed processing of data, the neurosynaptic processing device is configured to perform operations requiring frequent access to memory and involving sub-symbolic computing including classifying data categorized as sub-symbolic data into classified data with one or more text classification labels relating to a content or context of the data, and the neurosynaptic processing device is further configured to exchange, via the interconnect circuit, the classified data with the serial processing device to process the classified data based on the one or more text classification labels; and wherein the serial processing device comprises at least one processor core configured for sequential and centralized processing of data, the serial processing device is configured to perform operations requiring infrequent access to the memory and involving symbolic computing including pre-processing data categorized as symbolic data into pre-processed data, and the serial processing device is further configured to exchange, via the interconnect circuit, the pre-processed data with the neurosynaptic processing device to classify the pre-processed data.

2. The method of claim 1, wherein each neurosynaptic core circuit comprises multiple electronic neurons interconnected with multiple electronic axons via a plurality of synapse devices, and the core circuits operate in parallel and are event driven.

3. The method of claim 1, wherein the operations involving sub-symbolic computing require more access to the memory than the operations involving symbolic computing.

4. The method of claim 1, wherein:
data categorized as symbolic data comprise pre-labeled data, tagged data, or categorized data; and
data categorized as sub-symbolic data comprise a raw image, raw audio, or raw sensor data.

5. The method of claim 1, wherein the controller device routes the data received to the serial processing device to pre-process the data received if the data received comprises an image, a pre-processed image resulting from the pre-processing is exchanged with the neurosynaptic processing device to classify the pre-processed image, and a classification label resulting from the classifying is exchanged with the serial processing device for further processing.

6. A system comprising a computer processor, a computer-readable hardware storage medium, and program code embodied with the computer-readable hardware storage medium for execution by the computer processor to implement a method comprising:
at a controller device:

determining a set of operations to perform on data received based on a type of the data received by parsing the data received and categorizing the data received as one of sub-symbolic data or symbolic data; and improving efficiency of performing the set of operations on the data received by routing the data received to one of: a serial processing device in response to categorizing the data received as symbolic data, or a neurosynaptic processing device in response to categorizing the data received as sub-symbolic data;

wherein the neurosynaptic processing device and the serial processing device are coupled via an interconnect circuit;

wherein the neurosynaptic processing device comprises multiple neurosynaptic core circuits configured for parallel and distributed processing of data, the neurosynaptic processing device is configured to perform operations requiring frequent access to memory and involving sub-symbolic computing including classifying data categorized as sub-symbolic data into classified data with one or more text classification labels relating to a content or context of the data, and the neurosynaptic processing device is further configured to exchange, via the interconnect circuit, the classified data with the serial processing device to process the classified data based on the one or more text classification labels; and wherein the serial processing device comprises at least one processor core configured for sequential and centralized processing of data, the serial processing device is configured to perform operations requiring infrequent access to the memory and involving symbolic computing including pre-processing data categorized as symbolic data into pre-processed data, and the serial processing device is further configured to exchange, via the interconnect circuit, the pre-processed data with the neurosynaptic processing device to classify the pre-processed data.

7. The system of claim 6, wherein each neurosynaptic core circuit comprises multiple electronic neurons interconnected with multiple electronic axons via a plurality of synapse devices, and the core circuits operate in parallel and are event driven.

8. The system of claim 6, wherein the operations involving sub-symbolic computing require more access to the memory than the operations involving symbolic computing.

9. The system of claim 6, wherein:
data categorized as symbolic data comprise pre-labeled data, tagged data, or categorized data; and
data categorized as sub-symbolic data comprise a raw image, raw audio, or raw sensor data.

10. A computer program product comprising a non-transitory computer-readable hardware storage device having program code embodied therewith, the program code being executable by a computer to implement a method comprising:
at a controller device:

determining a set of operations to perform on data received based on a type of the data received by parsing the data received and categorizing the data received as one of sub-symbolic data or symbolic data; and improving efficiency of performing the set of operations on the data received by routing the data received to one of: a serial processing device in response to categorizing the data received as symbolic data, or a neurosynaptic processing device in response to categorizing the data received as sub-symbolic data;

wherein the neurosynaptic processing device and the serial processing device are coupled via an interconnect circuit;

wherein the neurosynaptic processing device comprises multiple neurosynaptic core circuits configured for parallel and distributed processing of data, the neurosynaptic processing device is configured to perform operations requiring frequent access to memory and involving sub-symbolic computing including classifying data categorized as sub-symbolic data into classified data with one or more text classification labels relating to a content or context of the data, and the neurosynaptic processing device is further configured to exchange, via the interconnect circuit, the classified data with the serial processing device to process the classified data based on the one or more text classification labels; and wherein the serial processing device comprises at least one processor core configured for sequential and centralized processing of data, the serial processing device is configured to perform operations requiring infrequent access to the memory and involving symbolic computing including pre-processing data categorized as symbolic data into pre-processed data, and the serial processing device is further configured to exchange, via the interconnect circuit, the pre-processed data with the neurosynaptic processing device to classify the pre-processed data.

11. The computer program product of claim 10, wherein each neurosynaptic core circuit comprises multiple electronic neurons interconnected with multiple electronic axons via a plurality of synapse devices, and the core circuits operate in parallel and are event driven.

12. The computer program product of claim 10, wherein the operations involving sub-symbolic computing require more access to the memory than the operations involving symbolic computing.

13. The computer program product of claim 10, wherein:
data categorized as symbolic data comprise pre-labeled data, tagged data, or categorized data; and
data categorized as sub-symbolic data comprise a raw image, raw audio, or raw sensor data.

* * * * *